United States Patent
Proctor

(10) Patent No.: US 10,321,278 B2
(45) Date of Patent: Jun. 11, 2019

(54) METHOD AND DEVICE FOR RESPONDING TO A QUERY

(71) Applicant: MOTOROLA SOLUTIONS, INC, Chicago, IL (US)

(72) Inventor: Lee M. Proctor, Cary, IL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 0 days.

(21) Appl. No.: 15/701,474

(22) Filed: Sep. 12, 2017

(65) Prior Publication Data

US 2019/0082305 A1   Mar. 14, 2019

(51) Int. Cl.
| | | |
|---|---|---|
| *H04W 4/10* | (2009.01) | |
| *H04W 4/08* | (2009.01) | |
| *H04W 12/10* | (2009.01) | |
| *H04L 29/06* | (2006.01) | |
| *G06F 16/9535* | (2019.01) | |

(52) U.S. Cl.
CPC .......... *H04W 4/10* (2013.01); *G06F 16/9535* (2019.01); *H04L 63/102* (2013.01); *H04W 4/08* (2013.01); *H04W 12/10* (2013.01)

(58) Field of Classification Search
CPC ......... H04W 4/10; H04W 76/45; H04W 4/20; H04L 65/1069
See application file for complete search history.

(56) References Cited

U.S. PATENT DOCUMENTS

| | | | |
|---|---|---|---|
| 5,473,605 A | 12/1995 | Grube et al. | |
| 7,747,719 B1 | 6/2010 | Horvitz et al. | |
| 7,748,027 B2 | 6/2010 | Patrick | |
| 9,021,561 B2 | 4/2015 | Agulnik et al. | |
| 9,058,813 B1 | 6/2015 | Blanksteen | |
| 2004/0102186 A1* | 5/2004 | Odinak | H04M 3/53375 455/416 |
| 2008/0057992 A1* | 3/2008 | Griffin | H04W 4/08 455/518 |
| 2014/0108370 A1 | 4/2014 | Andri et al. | |

(Continued)

OTHER PUBLICATIONS

Robert Popp and John Poindexter: "Countering Terrorism through Information and Privacy Protection Technologies", IEEE Security & Privacy vol. 4 Issue: 6, 2006, pp. 18-27.

(Continued)

*Primary Examiner* — Dong-Chang Shiue
(74) *Attorney, Agent, or Firm* — Raguraman Kumaresan

(57) ABSTRACT

A process and device for responding to a query includes receiving, at an electronic computing device, a query for providing a response at a first communication device. The process further includes determining that the response to the query is to be provided as a group response to communication devices in the first communication group. When one or more of the communication devices do not have permission to receive the group response, the electronic computing device causes modification of the group response to generate a second response and provides the second response to at least one of the communication devices in the first communication group. Alternatively, the electronic computing device alters an output action and provides the group response to at least one of the communication devices in the first communication group in accordance with the altered output action.

20 Claims, 5 Drawing Sheets

(56) References Cited

U.S. PATENT DOCUMENTS

| | | |
|---|---|---|
| 2014/0149322 A1 | 5/2014 | Lavoie et al. |
| 2015/0117397 A1* | 4/2015 | Ofir .................. H04L 65/60 370/331 |
| 2016/0183065 A1* | 6/2016 | Du .................... H04W 4/10 370/312 |
| 2016/0205517 A1* | 7/2016 | Luo ................... H04W 4/16 455/518 |
| 2017/0083622 A1 | 3/2017 | Blanco |

OTHER PUBLICATIONS

The International Search Report and the Written Opinion, corresponding patent serial No. PCT/US2018/048481 filed Aug. 29, 2018, dated Nov. 26, 2018, all pages.

* cited by examiner

METHOD AND DEVICE FOR RESPONDING TO A QUERY

BACKGROUND OF THE INVENTION

Tablets, laptops, phones (for example, cellular or satellite), mobile (vehicular) or portable (personal) two-way radios, and other communication devices are now in common use by users, such as first responders (including firemen, police officers, and paramedics, among others), and provide such users and others with instant access to increasingly valuable additional information and resources such as vehicle histories, arrest records, outstanding warrants, health information, real-time traffic or other situational status information, and any other information that may aid the user in making a more informed determination of an action to take or how to resolve a situation, among other possibilities.

Many such communication devices further comprise, or provide access to, electronic digital assistants (or sometimes referenced as "virtual partners") that may provide the user thereof with valuable information in an automated (for example, without further user input) or semi-automated (for example, with some further user input) fashion. The valuable information provided to the user may be based on explicit requests for such information posed by the user via an input (for example, such as a parsed natural language input or an electronic touch interface manipulation associated with an explicit request) in which the electronic digital assistant may reactively provide such requested valuable information, or may be based on some other set of one or more context or triggers in which the electronic digital assistant may proactively provide such valuable information to the user absent any explicit request from the user.

As some existing examples, electronic digital assistants such as Siri provided by Apple, Inc.® and Google Now provided by Google, Inc.®, are software applications running on underlying electronic hardware that are capable of understanding natural language, and may complete electronic tasks in response to user voice inputs, among other additional or alternative types of inputs. These electronic digital assistants may perform such tasks as taking and storing voice dictation for future reference and retrieval, reading a received text message or an e-mail message aloud, generating a text message or e-mail message reply, looking up requested phone numbers and initiating a phone call to a requested contact, generating calendar appointments and providing appointment reminders, warning users of nearby dangers such as traffic accidents or environmental hazards, and providing many other types of information in a reactive or proactive manner.

BRIEF DESCRIPTION OF THE SEVERAL VIEWS OF THE DRAWINGS

The accompanying figures, where like reference numerals refer to identical or functionally similar elements throughout the separate views, which together with the detailed description below are incorporated in and form part of the specification and serve to further illustrate various embodiments of concepts that include the claimed invention, and to explain various principles and advantages of those embodiments.

Figure 1:
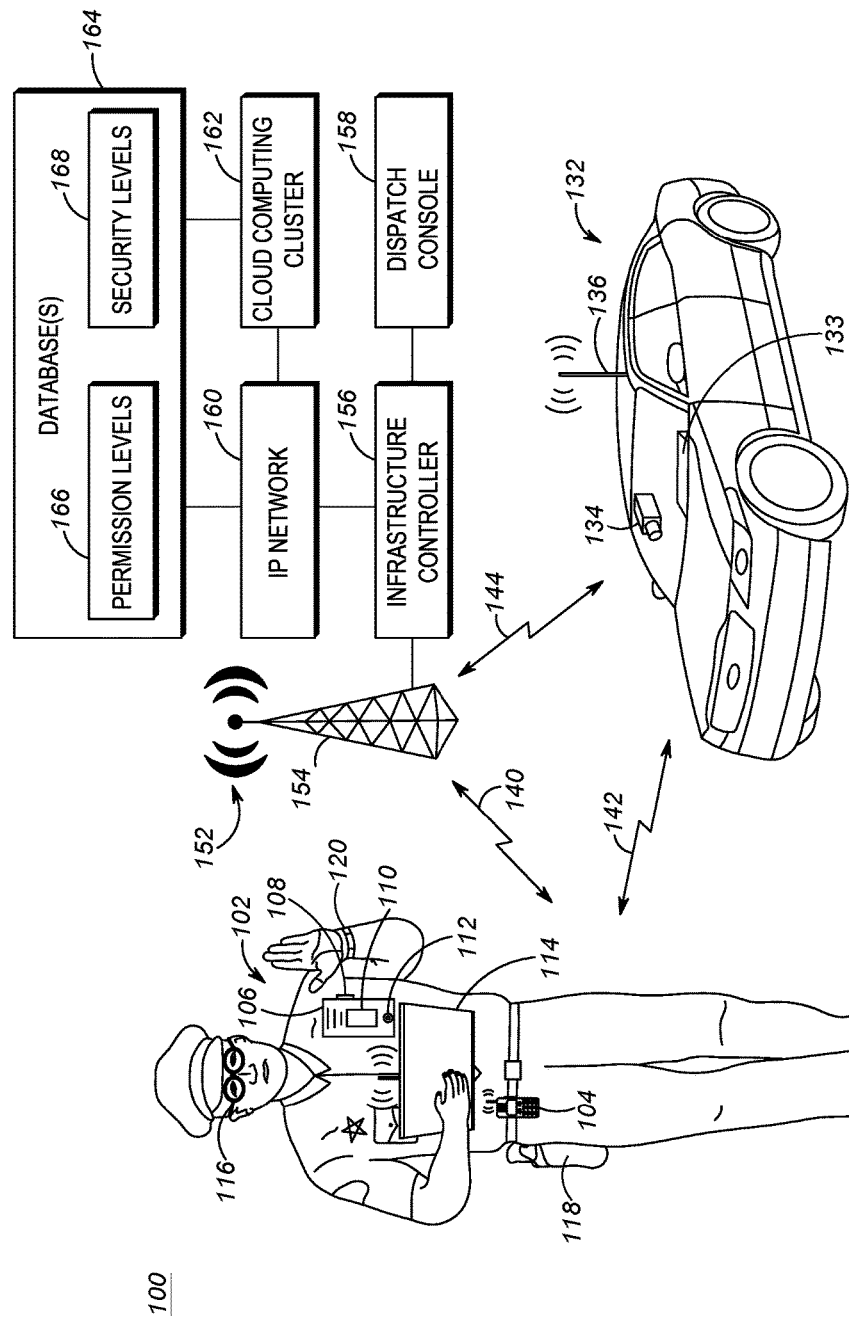
FIG. 1 is a system diagram illustrating a system for operating an electronic digital assistant, in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

In public safety communication systems, communication devices are often affiliated to different communication groups (also referred to as talk groups) to perform group communication. Group communication functionality allows a communication device (also referred to as a talk group member) to simultaneously communicate with multiple other devices that are associated with the same communication group. This avoids the need for communication devices to repeat the same message or establish different communication sessions to communicate the same message to other devices. In communication devices such as land mobile radios, a push to talk interface is implemented to allow a user of the radio to press the push to talk interface to transmit audio on one or more communication channels (which may include a talk group channel or private channel) for reception by multiple users associated with the talk group or for reception by a single user, respectively.

Electronic digital assistants are implemented in such communication systems to assist users with providing relevant information and/or performing automated tasks in response to user queries. For example, when a query is received at a particular communication device, electronic digital assistants can be automatically configured to route the query or a response to the query to communication devices that are associated with the same communication group. While pre-configuring the system to automatically route a query or response (received at a single communication device) to all communication devices in the group improves efficiency in distribution of information to members of a communication group, it is possible that the generated response (or the query itself) may contain sensitive or confidential data. In such cases, when a response to a query is to be routed as a group response to multiple devices in a communication group, communication systems implementing electronic digital assistants need to perform additional functions to ensure that a generated group response with sensitive and/or confidential data is not received and/or played back by devices in the group that are not authorized to access or play back the group response.

Disclosed is an improved method and device for an electronic digital assistant to process and respond to a query received at a communication device in a communication group while ensuring that a group response generated in response to the query (or the query itself) is not received and/or played back at unauthorized devices in the same communication group.

One embodiment provides a method for responding to a query. The method includes receiving, at an electronic computing device, a query for providing a response at a first communication device, wherein the first communication device is a member of a first communication group of a plurality of communication devices, determining, at the electronic computing device, that the response to the query is to be provided as a group response to the plurality of communication devices including the first communication device in the first communication group, determining, at the electronic computing device, whether one or more of the communication devices in the first communication group do not have permission to receive the group response; and in response to determining that one or more of the communication devices do not have permission to receive the group response, causing, at the electronic computing device, one or more of (i) modifying the group response to generate a second response for which each of the communication devices in the first communication group has permission to receive the second response and providing the second response to at least one of the communication devices in the first communication group, and (ii) altering an output action and providing the group response to at least one of the communication devices in the first communication group in accordance with the altered output action.

Another embodiment provides an electronic computing device that includes an electronic processor and a communication interface communicatively coupled to the electronic processor. The electronic processor is configured to receive, via the communication interface, a query for providing a response at a first communication device, wherein the first communication device is a member of a first communication group of a plurality of communication devices, determine that the response to the query is to be provided as a group response to the plurality of communication devices including the first communication device in the first communication group, determine whether one or more of the communication devices in the first communication group do not have permission to receive the group response, and when one or more of the communication devices do not have permission to receive the group response, (i) modify the group response to generate a second response for which each of the communication devices in the first communication group has permission to receive the second response and provide, via the communication interface, the second response to at least one of the communication devices in the first communication group, and (ii) alter an output action and provide, via the communication interface, the group response to at least one of the communication devices in the first communication group in accordance with the altered output action.

A further embodiment provides another method for responding to a query. The method includes receiving, at an electronic computing device, a query for providing a response at a first communication device, wherein the first communication device is a member of a first communication group of a plurality of communication devices, determining, at the electronic computing device, that the query corresponds to a group query that is to be provided to the communication devices in the first communication group, determining, at the electronic computing device, whether one or more of the communication devices in the first communication group do not have permission to receive the query; and in response to determining that one or more of the communication devices do not have permission to receive the query, causing, at the electronic computing device, one or more of (i) modifying the query to generate a modified query for which each of the communication devices in the first communication group has permission to receive the modified query and transmitting the modified query on a group communication channel associated with the first communication group, and (ii) altering an output action and providing the query to at least one of the communication devices in the first communication group in accordance with the altered output action.

Each of the above-mentioned embodiments will be discussed in more detail below, starting with example communication system and device architectures of the system in which the embodiments may be practiced, followed by an illustration of processing steps for achieving the method, device, and system for an electronic digital assistant. Further advantages and features consistent with this disclosure will be set forth in the following detailed description, with reference to the figures.

1. Communication System and Device Structures a. Communication System Structure

Figure 2:
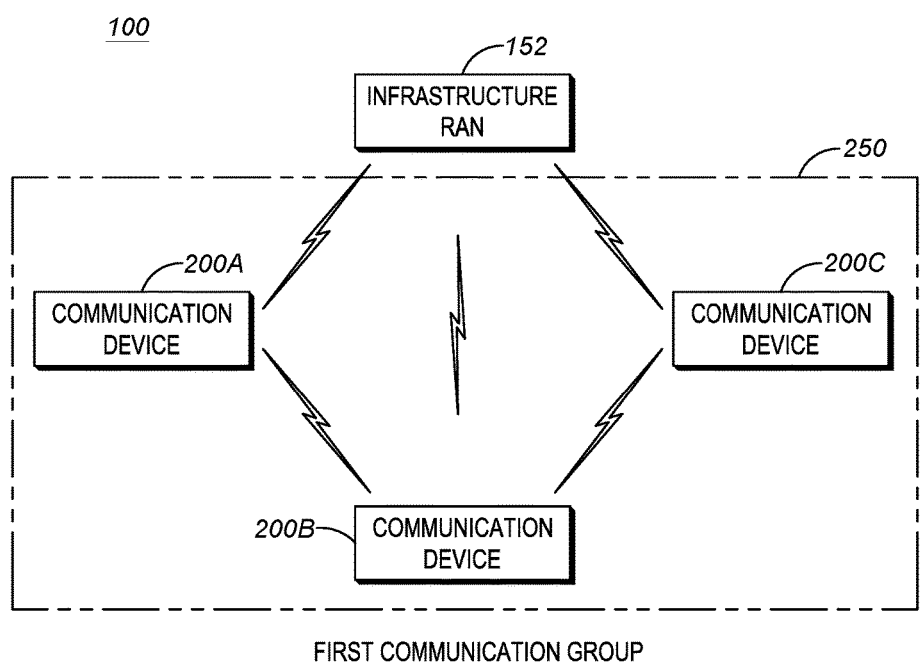
FIG. 2 is a system diagram illustrating a plurality of communication devices of FIG. 1 that are associated with a talk group for performing group communication, in accordance with some embodiments.

Referring now to the drawings, and in particular FIGS. 1 and 2, a communication system 100 is shown including a first set of devices that a user 102 (illustrated in FIG. 1 as a first responder police officer) may wear, such as a primary battery-powered portable radio 104 used for narrowband and/or broadband direct-mode or infrastructure communications, a battery-powered radio speaker microphone (RSM) video capture device 106, a laptop 114 having an integrated video camera and used for data applications such as incident support applications, smart glasses 116 (for example, which may be virtual reality, augmented reality, or mixed reality glasses), sensor-enabled holster 118, and/or biometric sensor wristband 120. Although FIG. 1 illustrates only a single user 102 with a respective first set of devices, in other embodiments, the single user 102 may include additional sets of same or similar devices, and additional users may be present with respective additional sets of same or similar devices as indicated by FIG. 2.

System 100 may also include a vehicle 132 associated with the user 102 having an integrated mobile communication device 133, an associated vehicular video camera 134, and a coupled vehicular transceiver 136. Although FIG. 1 illustrates only a single vehicle 132 with a single mobile communication device 133, respective single vehicular video camera 134 and/or microphone, and a single coupled vehicular transceiver 136, in other embodiments, the vehicle 132 may include additional same or similar mobile communication devices, video cameras, microphones, and/or transceivers, and additional vehicles may be present with respective additional sets of mobile communication devices, video cameras, microphones, and/or transceivers.

Each of the portable radio 104, RSM video capture device 106, laptop 114, and vehicular mobile communication device 133 may be capable of directly wirelessly communicating via direct-mode wireless link(s) 142, and/or may be capable of wirelessly communicating via a wireless infrastructure radio access network (RAN) 152 over respective wireless link(s) 140, 144 and via corresponding transceiver circuits. These devices are configured to receive inputs associated with the user 102 and/or provide outputs to the user 102 in addition to communicating information to and from other communication devices and the infrastructure RAN 152.

Many of the devices shown in FIG. 1 (such as the portable radio 104, the RSM video capture device 106, the laptop 114, the mobile communication device 133, the infrastructure controller 156, dispatch console 158, and one or more computing devices in the cloud computing cluster 162) may be referred to as communication devices (for example, a communication device 200 as explained below with respect to FIG. 2). Although FIG. 1 shows multiple communication devices associated with the user 102, in some embodiments, the communication system 100 includes communication devices 200 of multiple users. For example, as shown in FIG. 2, the communication device 200A may be associated with a first user, the communication device 200B may be associated with a second user, and the communication device 200C may be associated with a third user. Further, as shown in FIG. 2, the communication devices 200A, 200B, and 200C are members of a same communication group (referred to as a first communication group 250). Although not shown in FIG. 2, each of the communication devices 200A, 200B, 200C may also be associated with one or more communication groups other than the first communication group 250. In some embodiments, the communication devices 200A, 200B, and 200C communicate with each other over the infrastructure RAN 152 and/or communicate with each other directly as described previously herein. Similarly, other devices, such as the dispatch console 158, may communicate with communication devices 200 of multiple users through the infrastructure RAN 152. In some embodiments, one or more users may have multiple associated communication devices 200, for example, as shown in FIG. 1.

Figure 4:
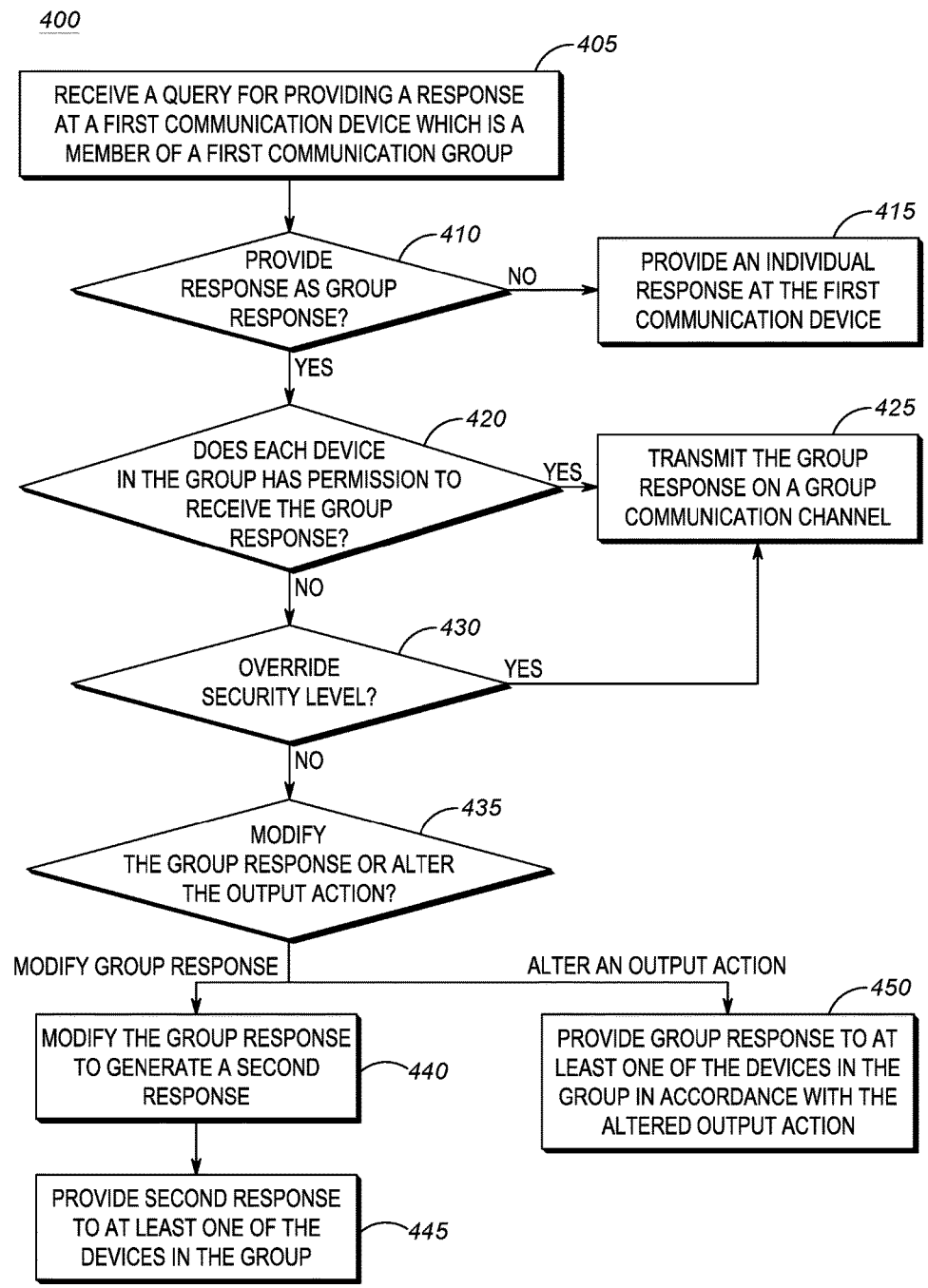
FIG. 4 illustrates a flow chart of a method of responding to a query in accordance with some embodiments.
Figure 5:
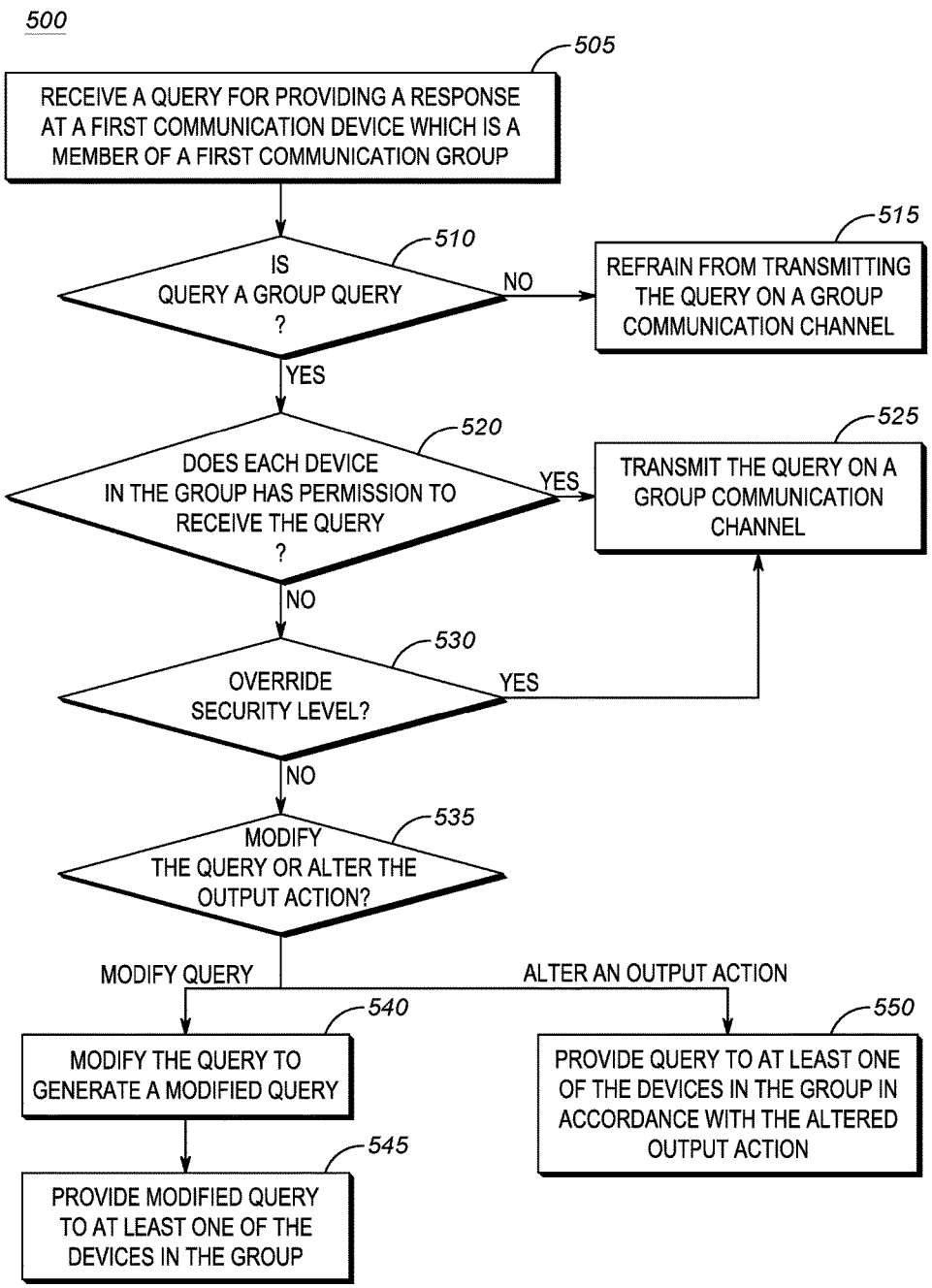
FIG. 5 illustrates a flow chart of a method of responding to a query in accordance with some embodiments.

In accordance with embodiments, even though the communication devices 200A, 200B, 200C are associated with the same communication group (i.e. first communication group 250), it is possible that the communication devices 200A, 200B, and 200C may not have equal permissions to access or receive certain restricted data communicated or intended to be communicated within the group 250. For example, assume that the user of the communication device 200A has a query with respect to identity of a witness associated with a particular incident. When the user provides the query at the communication device 200A, the query and/or response that may be generated in response to the query may be relevant to one or more communication groups (for example, group 250) associated with the communication device 200A. In such cases, when the response to the query (or the query itself) generated for a single communication device (for example, device 200A) is also relevant to the communication group (for example, group 250) associated with the single communication device 200A, embodiments of the present disclosure in accordance with the methods described herein with reference to FIGS. 4 and 5 provides transmission of the query or response (or modifications thereof) to some or all of the members (for example, devices 200B, 200C) of the group while ensuring that restricted data included in the query or the response is not received by members not having permission to access such restricted data in the group.

Referring back to FIG. 1, the portable radio 104, in particular, may be any communication device used for infrastructure RAN or direct-mode media (for example, voice, audio, video, etc.) communication via a long-range wireless transmitter and/or transceiver that has a transmitter transmit range on the order of miles, for example, 0.5-50 miles, or 3-20 miles (for example, in comparison to a short-range transmitter such as a Bluetooth, Zigbee, or NFC transmitter) with other communication devices and/or the infrastructure RAN 152. The long-range transmitter may implement a direct-mode, conventional, or trunked land mobile radio (LMR) standard or protocol such as European Telecommunications Standards Institute (ETSI) Digital Mobile Radio (DMR), a Project 25 (P25) standard defined by the Association of Public Safety Communications Officials International (APCO), Terrestrial Trunked Radio (TETRA), or other LMR radio protocols or standards. In other embodiments, the long range transmitter may implement a Long Term Evolution (LTE), LTE-Advance, or 5G protocol including multimedia broadcast multicast services (MBMS) or single site point-to-multipoint (SC-PTM) over which an open mobile alliance (OMA) push to talk (PTT) over cellular (OMA-PoC), a voice over IP (VoIP), an LTE Direct or LTE Device to Device, or a PTT over IP (PoIP) application may be implemented. In still further embodiments, the long range transmitter may implement a Wi-Fi protocol perhaps in accordance with an IEEE 802.11 standard (for example, 802.11a, 802.11b, 802.11g) or a WiMAX protocol perhaps operating in accordance with an IEEE 802.16 standard.

In the example of FIG. 1, the portable radio 104 may form the hub of communication connectivity for the user 102, through which other accessory devices, such as a biometric sensor (for example, the biometric sensor wristband 120), an activity tracker, a weapon status sensor (for example, the sensor-enabled holster 118), a heads-up-display (for example, the smart glasses 116), the RSM video capture device 106, and/or the laptop 114 may communicatively couple.

In order to communicate with and exchange video, audio, and other media and communications with the RSM video capture device 106, laptop 114, and/or smart glasses 116, the portable radio 104 may contain one or more physical electronic ports (such as a universal serial bus (USB) port, an Ethernet port, an audio jack, etc.) for direct electronic coupling with the RSM video capture device 106, laptop 114, and/or smart glasses 116. In some embodiments, the portable radio 104 may contain a short-range transmitter (for example, in comparison to the long-range transmitter such as a LMR or Broadband transmitter) and/or transceiver for wirelessly coupling with the RSM video capture device 106, laptop 114, and/or smart glasses 116. The short-range transmitter may be a Bluetooth, Zigbee, or near field communication (NFC) transmitter having a transmit range on the order of 0.01-100 meters, or 0.1-10 meters. In other embodiments, the RSM video capture device 106, the laptop 114, and/or the smart glasses 116 may contain their own long-range transceivers and may communicate with one another and/or with the infrastructure RAN 152 or vehicular transceiver 136 directly without passing through portable radio 104.

The RSM video capture device 106 provides voice functionality features similar to a traditional RSM, including one or more of acting as a remote microphone that is closer to the user's 102 mouth, providing a remote speaker allowing playback of audio closer to the user's 102 ear, and including a PTT switch or other type of PTT input. The voice and/or audio recorded at the remote microphone may be provided to the portable radio 104 for storage and/or analysis or for further transmission to other mobile communication devices or the infrastructure RAN 152, or may be directly transmitted by the RSM video capture device 106 to other communication devices or to the infrastructure RAN 152. The voice and/or audio played back at the remote speaker may be received from the portable radio 104 or received directly from one or more other communication devices or the infrastructure RAN 152. The RSM video capture device 106 may include a separate physical PTT switch 108 that functions, in cooperation with the portable radio 104 or on its own, to maintain the portable radio 104 and/or RSM video capture device 106 in a monitor only mode, and which switches the device(s) to a transmit-only mode (for half-duplex devices) or transmit and receive mode (for full-duplex devices) upon depression or activation of the PTT switch 108. The portable radio 104 and/or RSM video capture device 106 may form part of a group communications architecture (such as a communication group shown in FIG. 2) that allows a single communication device to communicate with one or more group members (not shown) associated with a particular group of devices at a same time.

Additional features may be provided at the RSM video capture device 106 as well. For example, a display screen 110 may be provided for displaying images, video, and/or text to the user 102 or to someone else. The display screen 110 may be, for example, a liquid crystal display (LCD) screen or an organic light emitting display (OLED) display screen. In some embodiments, a touch sensitive input interface may be incorporated into the display screen 110 as well, allowing the user 102 to interact with content provided on the display screen 110. A soft PTT input may also be provided, for example, via such a touch interface.

A video camera 112 may also be provided at the RSM video capture device 106, integrating an ability to capture images and/or video and store the captured image data (for further analysis) or transmit the captured image data as an image or video stream to the portable radio 104 and/or to other communication devices or to the infrastructure RAN 152 directly. The video camera 112 and RSM remote microphone may be used, for example, for capturing audio and/or video of a field-of-view associated with the user 102, perhaps including a suspect and the suspect's surroundings, storing the captured image and/or audio data for further analysis or transmitting the captured audio and/or video data as an audio and/or video stream to the portable radio 104 and/or to other communication devices or to the infrastructure RAN 152 directly for further analysis. An RSM remote microphone of the RSM video capture device 106 may be an omni-directional or unidirectional microphone or array of omni-directional or unidirectional microphones that may be capable of identifying a direction from which a captured sound emanated.

In some embodiments, the RSM video capture device 106 may be replaced with a more limited body worn camera that may include the video camera 112 and/or microphone noted above for capturing audio and/or video, but may forego one or more of the features noted above that transform the body worn camera into a more full featured RSM, such as the separate physical PTT switch 108 and the display screen 110, and remote microphone functionality for voice communications in cooperation with portable radio 104.

The laptop 114, in particular, may be any wireless communication device used for infrastructure RAN or direct-mode media communication via a long-range or short-range wireless transmitter with other communication devices and/or the infrastructure RAN 152. The laptop 114 includes a display screen for displaying a user interface to an operating system and one or more applications running on the operating system, such as a broadband PTT communications application, a web browser application, a vehicle history database application, a workflow application, a forms or reporting tool application, an arrest record database application, an outstanding warrant database application, a mapping and/or navigation application, a health information database application, and/or other types of applications that may require user interaction to operate. The laptop 114 display screen may be, for example, an LCD screen or an OLED display screen. In some embodiments, a touch sensitive input interface may be incorporated into the display screen as well, allowing the user 102 to interact with content provided on the display screen. A soft PTT input may also be provided, for example, via such a touch interface.

Front and/or rear-facing video cameras may also be provided at the laptop 114, integrating an ability to capture video and/or audio of the user 102 and the user's 102 surroundings, perhaps including a field-of-view of the user 102 and/or a suspect (or potential suspect) and the suspect's surroundings, and store and/or otherwise process the captured video and/or audio for further analysis or transmit the captured video and/or audio as a video and/or audio stream to the portable radio 104, other communication devices, and/or the infrastructure RAN 152 for further analysis.

The smart glasses 116 may include a digital imaging device, an electronic processor, a short-range and/or long-range transceiver device, and/or a projecting device. The smart glasses 116 may maintain a bi-directional connection with the portable radio 104 and provide an always-on or on-demand video feed pointed in a direction of the user's 102 gaze via the digital imaging device, and/or may provide a personal display via the projection device integrated into the smart glasses 116 for displaying information such as text, images, or video received from the portable radio 104 or directly from the infrastructure RAN 152. In some embodiments, the smart glasses 116 may include its own long-range transceiver and may communicate with other communication devices and/or with the infrastructure RAN 152 or vehicular transceiver 136 directly without passing through portable radio 104. In some embodiments, an additional user interface mechanism such as a touch interface or gesture detection mechanism may be provided at the smart glasses 116 that allows the user 102 to interact with the display elements displayed on the smart glasses 116 or projected into the user's 102 eyes, or to modify operation of the digital imaging device. In other embodiments, a display and input interface at the portable radio 104 may be provided for interacting with smart glasses 116 content and modifying operation of the digital imaging device, among other possibilities.

The smart glasses 116 may provide a virtual reality interface in which a computer-simulated reality electronically replicates an environment with which the user 102 may interact. In some embodiments, the smart glasses 116 may provide an augmented reality interface in which a direct or indirect view of real-world environments in which the user is currently disposed are augmented (that is, supplemented, by additional computer-generated sensory input such as sound, video, images, graphics, GPS data, or other information). In still other embodiments, the smart glasses 116 may provide a mixed reality interface in which electronically generated objects are inserted in a direct or indirect view of real-world environments in a manner such that they may co-exist and interact in real time with the real-world environment and real world objects.

The sensor-enabled holster 118 may be an active (powered) or passive (non-powered) sensor that maintains and/or provides state information regarding a weapon or other item normally disposed within the user's 102 sensor-enabled holster 118. The sensor-enabled holster 118 may detect a change in state (presence to absence) and/or an action (removal) relative to the weapon normally disposed within the sensor-enabled holster 118. The detected change in state and/or action may be reported to the portable radio 104 via its short-range transceiver. In some embodiments, the sensor-enabled holster 118 may also detect whether the first responder's hand is resting on the weapon even if it has not yet been removed from the holster and provide such information to portable radio 104. In some embodiments, a weapon of the user 102 may include a sensor that detects when the weapon is discharged. The detected discharge may be reported to the portable radio 104, for example. Other possibilities exist as well.

The biometric sensor wristband 120 may be an electronic device for tracking an activity of the user 102 or a health status of the user 102, and may include one or more movement sensors (such as an accelerometer, magnetometer, and/or gyroscope) that may periodically or intermittently provide to the portable radio 104 indications of orientation, direction, steps, acceleration, and/or speed, and indications of health such as one or more of a captured heart rate, a captured breathing rate, and a captured body temperature of the user 102, perhaps accompanying other information. In some embodiments, the biometric sensor wristband 120 may include its own long-range transceiver and may communicate with other communication devices and/or with the infrastructure RAN 152 or vehicular transceiver 136 directly without passing through portable radio 104.

An accelerometer is a device that measures acceleration. Single and multi-axis models are available to detect magnitude and direction of the acceleration as a vector quantity, and may be used to sense orientation, acceleration, vibration shock, and falling. A gyroscope is a device for measuring or maintaining orientation, based on the principles of conservation of angular momentum. One type of gyroscope, a microelectromechanical system (MEMS) based gyroscope, uses lithographically constructed versions of one or more of a tuning fork, a vibrating wheel, or resonant solid to measure orientation. Other types of gyroscopes could be used as well. A magnetometer is a device used to measure the strength and/or direction of the magnetic field in the vicinity of the device, and may be used to determine a direction in which a person or device is facing.

The heart rate sensor may use electrical contacts with the skin to monitor an electrocardiography (EKG) signal of its wearer, or may use infrared light and imaging device to optically detect a pulse rate of its wearer, among other possibilities.

A breathing rate sensor may be integrated within the sensor wristband 120 itself, or disposed separately and communicate with the sensor wristband 120 via a short range wireless or wired connection. The breathing rate sensor may include use of differential capacitive circuits or capacitive transducers to measure chest displacement and thus breathing rates. In other embodiments, a breathing sensor may monitor a periodicity of mouth and/or nose-exhaled air (for example, using a humidity sensor, temperature sensor, capnometer or spirometer) to detect a respiration rate. Other possibilities exist as well.

A body temperature sensor may include an electronic digital or analog sensor that measures a skin temperature using, for example, a negative temperature coefficient (NTC) thermistor or a resistive temperature detector (RTD), may include an infrared thermal scanner module, and/or may include an ingestible temperature sensor that transmits an internally measured body temperature via a short range wireless connection, among other possibilities.

Although the biometric sensor wristband 120 is shown in FIG. 1 as a bracelet worn around the wrist, in other examples, the biometric sensor wristband 120 may additionally and/or alternatively be worn around another part of the body, or may take a different physical form including an earring, a finger ring, a necklace, a glove, a belt, or some other type of wearable, ingestible, or insertable form factor. In some embodiments, the biometric sensor wristband 120 or another device of the user 102 may detect characteristics of the environment of the user 102 (for example, temperature, humidity, air quality, and the like).

The portable radio 104, RSM video capture device 106, laptop 114, smart glasses 116, sensor-enabled holster 118, and/or biometric sensor wristband 120 may form a personal area network (PAN) via corresponding short-range PAN transceivers, which may be based on a Bluetooth, Zigbee, Bluetooth Low Energy, WiFi, Near Field Communication (NFC), Radio Frequency ID (RFID) or other short-range wireless protocol having a transmission range on the order of meters, tens of meters, or hundreds of meters.

The portable radio 104 and/or RSM video capture device 106 (or any other device in FIG. 1, for that matter) may each include a location determination device integrated with or separately disposed in the portable radio 104 and/or RSM 106 and/or in respective receivers, transmitters, or transceivers of the portable radio 104 and RSM 106 for determining a location of the portable radio 104 and RSM 106. The location determination device may be, for example, a global positioning system (GPS) receiver or wireless triangulation logic using a wireless receiver or transceiver and a plurality of wireless signals received at the wireless receiver or transceiver from different locations, among other possibilities. The location determination device may also include an orientation sensor for determining an orientation that the device is facing. Each orientation sensor may include a gyroscope and/or a magnetometer. Other types of orientation sensors could be used as well. The location may then be stored locally or transmitted via the transmitter or transceiver to other communication devices and/or to the infrastructure RAN 152.

The vehicle 132 associated with the user 102 may include the mobile communication device 133, the vehicular video camera 134 and/or microphone, and the vehicular transceiver 136, all of which may be coupled to one another via a wired and/or wireless vehicle area network (VAN), perhaps along with other sensors physically or communicatively coupled to the vehicle 132. The vehicular transceiver 136 may include a long-range transceiver for directly wirelessly communicating with communication devices such as the portable radio 104, the RSM 106, and the laptop 114 via wireless link(s) 142 and/or for wirelessly communicating with the RAN 152 via wireless link(s) 144. The vehicular transceiver 136 may further include a short-range wireless transceiver or wired transceiver for communicatively coupling between the mobile communication device 133 and/or the vehicular video camera 134 in the VAN. The mobile communication device 133 may, in some embodiments, include the vehicular transceiver 136 and/or the vehicular video camera 134 integrated therewith, and may operate to store and/or process video and/or audio produced by the video camera 134 and/or transmit the captured video and/or audio as a video and/or audio stream to the portable radio 104, other communication devices, and/or the infrastructure RAN 152 for further analysis. A microphone (not shown), or an array thereof, may be integrated in the video camera 134 and/or at the mobile communication device 133 (or additionally or alternatively made available at a separate location of the vehicle 132) and communicatively coupled to the mobile communication device 133 and/or vehicular transceiver 136 for capturing audio and storing, processing, and/or transmitting the audio in a same or similar manner to the video as set forth above. The omni-directional or uni-directional microphone, or an array thereof, may be integrated in the video camera 134 and/or at the mobile communication device 133 (or additionally or alternatively made available at a separate location of the vehicle 132) and communicably coupled to the mobile communication device 133 and/or vehicular transceiver 136 for capturing audio and storing, processing, and/or transmitting the audio in a same or similar manner as set forth above with respect to the RSM 106.

The vehicle 132 may be a human-operable vehicle, or may be a self-driving vehicle operable under control of the mobile communication device 133 perhaps in cooperation with video camera 134 (which may include a visible-light camera, an infrared camera, a time-of-flight depth camera, and/or a light detection and ranging (LiDAR) device). Command information and/or status information such as location and speed may be exchanged with the self-driving vehicle via the VAN and/or the PAN (when the PAN is in range of the VAN or via the VAN's infrastructure RAN link). In some embodiments, devices within the vehicle 132 may communicate with devices in other vehicles via a Vehicular to Vehicular (V2V) Network.

The vehicle 132 and/or transceiver 136, similar to the portable radio 104 and/or respective receivers, transmitters, or transceivers thereof, may include a location (and/or orientation) determination device integrated with or separately disposed in the mobile communication device 133 and/or transceiver 136 for determining (and storing and/or transmitting) a location (and/or orientation) of the vehicle 132.

In some embodiments, instead of a vehicle 132, a land, air, or water-based drone with the same or similar audio and/or video and communications capabilities and the same or similar self-navigating capabilities as set forth above may be disposed, and may similarly communicate with the user's 102 PAN and/or with the infrastructure RAN 152 to support the user 102 in the field.

The VAN may communicatively couple with the PAN disclosed above when the VAN and the PAN come within wireless transmission range of one another, perhaps after an authentication takes place there between. In some embodiments, one of the VAN and the PAN may provide infrastructure communications to the other, depending on the situation and the types of devices in the VAN and/or PAN and may provide interoperability and communication links between devices (such as video cameras) and sensors within the VAN and PAN.

Although the RSM 106, the laptop 114, and the vehicle 132 are illustrated in FIG. 1 as providing example video cameras and/or microphones for use in capturing audio and/or video streams, other types of cameras and/or microphones could be used as well, including but not limited to, fixed or pivotable video cameras secured to lamp posts, automated teller machine (ATM) video cameras, other types of body worn cameras such as head-mounted cameras, other types of vehicular cameras such as roof-mounted cameras, or other types of audio and/or video recording devices accessible via a wired or wireless network interface same or similar to that disclosed herein.

In some embodiments, one or more of the user 102, the vehicle 132, the portable radio 104, the RSM video capture device 106, and any other device in FIG. 1 may be equipped with an environmental sensor such as a chemical, biological, radiological, nuclear, or explosive (CBRNE) sensor. Measurements made by the CBRNE sensor may be stored locally or transmitted via a transmitter or transceiver to other communication devices and/or to the infrastructure RAN 152.

Infrastructure RAN 152 is a radio access network that provides for radio communication links to be arranged within the network between a plurality of user terminals. Such user terminals may be portable, mobile, or stationary and may include any one or more of the communication devices illustrated in FIG. 1, among other possibilities. At least one other terminal, for example used in conjunction with the communication devices, may be a fixed terminal, for example a base station, eNodeB, repeater, and/or access point. Such a RAN typically includes a system infrastructure that generally includes a network of various fixed terminals, which are in direct radio communication with the communication devices. Each of the fixed terminals operating in the RAN 152 may have one or more transceivers which may, for example, serve communication devices in a given region or area, known as a 'cell' or 'site', by radio frequency (RF) communication. The communication devices that are in direct communication with a particular fixed terminal are said to be served by the fixed terminal. In one example, all radio communications to and from each communication device within the RAN 152 are made via respective serving fixed terminals. Sites of neighboring fixed terminals may be offset from one another and may provide corresponding non-overlapping or partially or fully overlapping RF coverage areas.

Infrastructure RAN 152 may operate according to an industry standard wireless access technology such as, for example, an LTE, LTE-Advance, or 5G technology over which an OMA-PoC, a VoIP, an LTE Direct or LTE Device to Device, or a PoIP application may be implemented. Additionally or alternatively, infrastructure RAN 152 may implement a wireless local area network (WLAN) technology such as Wi-Fi perhaps operating in accordance with an IEEE 802.11 standard (for example, 802.11a, 802.11b, 802.11g) or such as a WiMAX perhaps operating in accordance with an IEEE 802.16 standard.

Infrastructure RAN 152 may additionally or alternatively operate according to an industry standard LMR wireless access technology such as, for example, the P25 standard defined by the APCO, the TETRA standard defined by the ETSI, the dPMR standard also defined by the ETSI, or the DMR standard also defined by the ETSI. Because these systems generally provide lower throughput than the broadband systems, they are sometimes designated narrowband RANs.

Communications in accordance with any one or more of these protocols or standards, or other protocols or standards, may take place over physical channels in accordance with one or more of a TDMA (time division multiple access), FDMA (frequency divisional multiple access), OFDMA (orthogonal frequency division multiplexing access), or CDMA (code division multiple access) technique.

OMA-PoC, in particular and as one example of an infrastructure broadband wireless application, enables familiar PTT and "instant on" features of traditional half duplex communication devices, but uses communication devices operating over modern broadband telecommunications networks. Using PoC, wireless communication devices such as mobile telephones and notebook computers can function as PTT half-duplex communication devices for transmitting and receiving. Other types of PTT models and multimedia call models (MMCMs) are also available.

Floor control in an OMA-PoC session is generally maintained by a PTT server that controls communications between two or more wireless communication devices. When a user of one of the communication devices keys a PTT button, a request for permission to speak in the OMA-PoC session is transmitted from the user's communication device to the PTT server using, for example, a real-time transport protocol (RTP) message. If no other users are currently speaking in the PoC session, an acceptance message is transmitted back to the user's communication device and the user may then speak into a microphone of the communication device. Using standard compression/decompression (codec) techniques, the user's voice is digitized and transmitted using discrete auditory data packets (for example, together which form an auditory data stream over time), such as according to RTP and internet protocols (IP), to the PTT server. The PTT server then transmits the auditory data packets to other users of the PoC session (for example, to other communication devices in the group of communication devices or talkgroup to which the user is subscribed), using for example, one or more of a unicast, point to multipoint, or broadcast communication technique.

Infrastructure narrowband LMR wireless systems, on the other hand, operate in either a conventional or trunked configuration. In either configuration, a plurality of communication devices is partitioned into separate groups of communication devices. In a conventional narrowband system, each communication device in a group is selected to a particular radio channel (frequency or frequency & time slot) for communications associated with that communication device's group. Thus, each group is served by one channel, and multiple groups may share the same single frequency (in which case, in some embodiments, group IDs may be present in the group data to distinguish between groups using the same shared frequency).

In contrast, a trunked radio system and its communication devices use a pool of traffic channels for virtually an unlimited number of groups of communication devices (for example, talkgroups). Thus, all groups are served by all channels. The trunked radio system works to take advantage of the probability that not all groups need a traffic channel for communication at the same time. When a member of a group requests a call on a control or rest channel on which all of the communication devices at a site idle awaiting new call notifications, in one embodiment, a call controller assigns a separate traffic channel for the requested group call, and all group members move from the assigned control or rest channel to the assigned traffic channel for the group call. In another embodiment, when a member of a group requests a call on a control or rest channel, the call controller may convert the control or rest channel on which the communication devices were idling to a traffic channel for the call, and instruct all communication devices that are not participating in the new call to move to a newly assigned control or rest channel selected from the pool of available channels. With a given number of channels, a much greater number of groups may be accommodated in a trunked radio system as compared with a conventional radio system.

Group communications such as group calls may be made between wireless and/or wireline participants in accordance with either a narrowband or a broadband protocol or standard. Group members for group calls may be statically or dynamically defined. That is, in a first example, a user or administrator working on behalf of the user may indicate to the switching and/or radio network (perhaps at a call controller, PTT server, zone controller, or mobile management entity (MME), base station controller (BSC), mobile switching center (MSC), site controller, Push-to-Talk controller, or other network device) a list of participants of a group at the time of the call or in advance of the call. The group members (for example, communication devices) could be provisioned in the network by the user or an agent, and then provided some form of group identity or identifier, for example. Then, at a future time, an originating user in a group may cause some signaling to be transmitted indicating that he or she wishes to establish a communication session (for example, group call) with each of the pre-designated participants in the defined group. In another example, communication devices may dynamically affiliate with a group (and also disassociate with the group) perhaps based on user input, and the switching and/or radio network may track group membership and route new group calls according to the current group membership.

In some instances, broadband and narrowband systems may be interfaced via a middleware system that translates between a narrowband PTT standard protocol (such as P25) and a broadband PTT standard protocol or application (such as OMA-PoC). Such intermediate middleware may include a middleware server for performing the translations and may be disposed in the cloud, disposed in a dedicated on-premises location for a client wishing to use both technologies, or disposed at a public carrier supporting one or both technologies. For example, and with respect to FIG. 1, such a middleware server may be disposed in infrastructure RAN 152 at infrastructure controller 156 or at a separate cloud computing cluster 162 communicably coupled to infrastructure controller 156 via internet protocol (IP) network 160, among other possibilities.

The infrastructure RAN 152 is illustrated in FIG. 1 as providing coverage for the portable radio 104, RSM video capture device 106, laptop 114, smart glasses 116, and/or vehicle transceiver 136 via a single fixed terminal 154 coupled to a single infrastructure controller 156 (for example, a radio controller, call controller, PTT server, zone controller, MME, BSC, MSC, site controller, Push-to-Talk controller, or other network device) and including the dispatch console 158 operated by a dispatcher. In other embodiments, additional fixed terminals and additional controllers may be disposed to support a larger geographic footprint and/or a larger number of mobile devices.

The infrastructure controller 156 illustrated in FIG. 1, or some other back-end infrastructure device or combination of back-end infrastructure devices existing on-premises or in the remote cloud computing cluster 162 accessible via the IP network 160 (such as the Internet), may additionally or alternatively operate as a back-end electronic digital assistant, a back-end audio and/or video processing device, and/or a remote cloud-based storage device consistent with the remainder of this disclosure.

The IP network 160 may comprise one or more routers, switches, LANs, WLANs, WANs, access points, or other network infrastructure, including but not limited to, the public Internet. The cloud computing cluster 162 may be comprised of a plurality of computing devices, such as the one set forth in FIG. 2, one or more of which may be executing none, all, or a portion of an electronic digital assistant service, sequentially or in parallel, across the one or more computing devices. The one or more computing devices comprising the cloud computing cluster 162 may be geographically co-located or may be separated by inches, meters, or miles, and inter-connected via electronic and/or optical interconnects. Although not shown in FIG. 1, one or more proxy servers or load balancing servers may control which one or more computing devices perform any part or all of the electronic digital assistant service.

As shown in FIG. 1, database(s) 164 may be accessible via the IP network 160 and/or the cloud computing cluster 162. As shown in FIG. 1, the databases 164 are communicatively coupled with the infrastructure RAN 152 to allow the communication devices (for example, the portable radio 104, the RSM video capture device 106, the laptop 114, and the mobile communication device 133) to communicate with and retrieve data from the databases 164 via infrastructure controller 156 and IP network 160. In some embodiments, the databases 164 are commercial cloud-based storage devices. In some embodiments, the databases 164 are housed on suitable on-premises database servers.

In accordance with some embodiments, the database(s) 164 includes information related to talk groups (e.g., talk group identifier) with which each of the communication devices (for example, communication devices 200A, 200B, 200C shown in FIG. 2) is associated. The database(s) 164 further includes information identifying security privileges (for example, permission levels 166) associated with communication devices 200 and/or corresponding users in the system 100. The database(s) 164 also includes information identifying security levels 168 for data (for example, for each restricted data) maintained at the database(s) 164. For example, the electronic digital assistant (or other computing devices in the system 100) accesses the permission level 166 of a given communication device 200 and security level 168 of the restricted data to determine whether the given communication device 200 has permission to access, receive, or play back the restricted data. In accordance with embodiments, the electronic digital assistant, when responding to a query received at a given communication device 200, accesses the database(s) 164 to determine whether each communication device 200 in the communication group associated with the given communication device 200 has permission to receive the response to the query and accordingly modifies the response or alters an output action with which the response is provided or played back at the communication devices 200.

The database(s) may further include databases such as a long-term video storage database, a historical or forecasted weather database, an offender database perhaps including facial recognition images to match against, a cartographic database of streets and elevations, a traffic database of historical or current traffic conditions, or other types of databases. Databases 164 may further include all or a portion of the databases described herein as being provided at the infrastructure controller 156. In some embodiments, the databases 164 may be maintained by third parties (for example, the National Weather Service or a Department of Transportation, respectively). The databases 164 of FIG. 1 are merely examples. In some embodiments, the system 100 additionally or alternatively includes other databases that store different information. In some embodiments, the databases 164 and/or additional or other databases are integrated with, or internal to, the infrastructure controller 156.

Finally, although FIG. 1 describes a communication system 100 generally as a public safety communication system that includes a user 102 generally described as a police officer and a vehicle 132 generally described as a police cruiser, in other embodiments, the communication system 100 may additionally or alternatively be a retail communication system including a user 102 that may be an employee of a retailer and a vehicle 132 that may be a vehicle for use by the user 102 in furtherance of the employee's retail duties (for example, a shuttle or self-balancing scooter). In other embodiments, the communication system 100 may additionally or alternatively be a warehouse communication system including a user 102 that may be an employee of a warehouse and a vehicle 132 that may be a vehicle for use by the user 102 in furtherance of the employee's retail duties (for example, a forklift). In still further embodiments, the communication system 100 may additionally or alternatively be a private security communication system including a user 102 that may be an employee of a private security company and a vehicle 132 that may be a vehicle for use by the user 102 in furtherance of the private security employee's duties (for example, a private security vehicle or motorcycle). In even further embodiments, the communication system 100 may additionally or alternatively be a medical communication system including a user 102 that may be a doctor or nurse of a hospital and a vehicle 132 that may be a vehicle for use by the user 102 in furtherance of the doctor or nurse's duties (for example, a medical gurney or ambulance). In still another example embodiment, the communication system 100 may additionally or alternatively be a heavy machinery communication system including a user 102 that may be a miner, driller, or extractor at a mine, oil field, or precious metal or gem field and a vehicle 132 that may be a vehicle for use by the user 102 in furtherance of the miner, driller, or extractor's duties (for example, an excavator, bulldozer, crane, front loader). Other possibilities exist as well.

b. Device Structure

Figure 3:
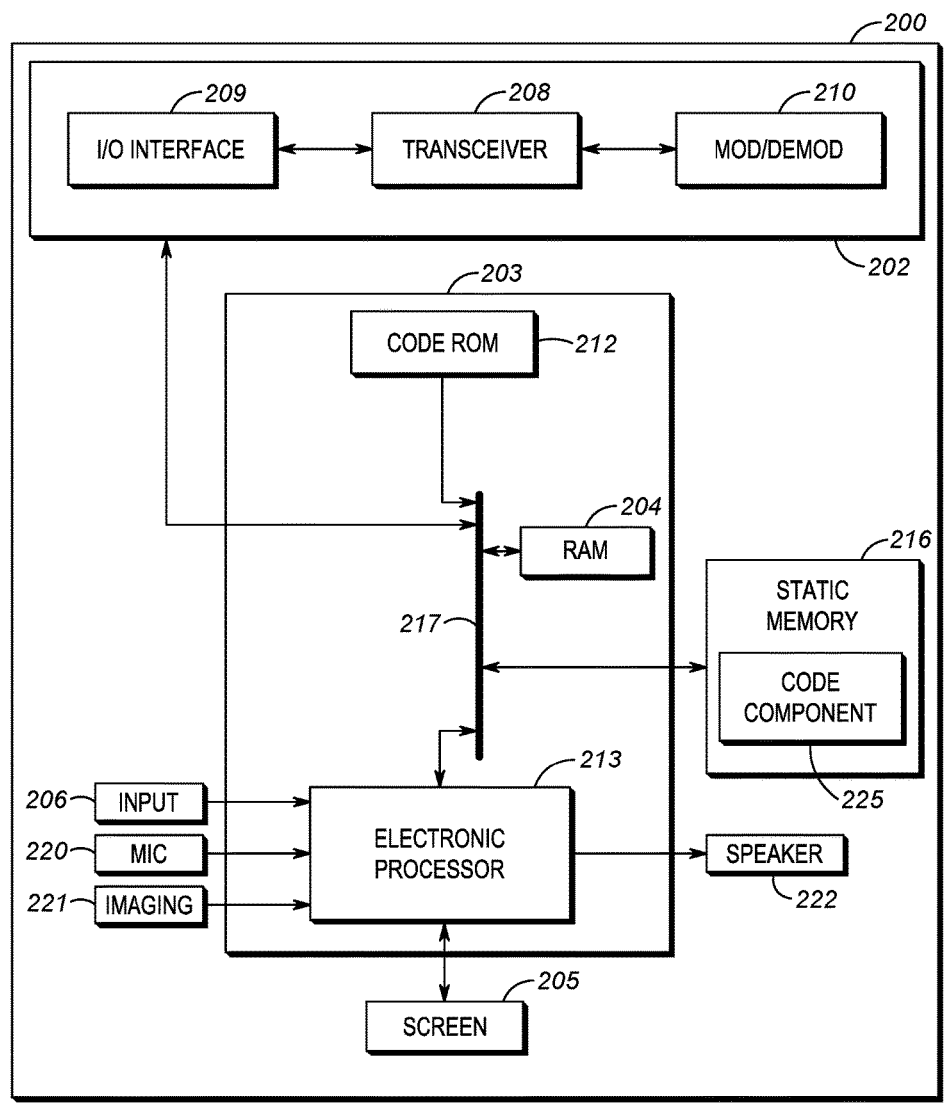
FIG. 3 is a device diagram showing a device structure of a communication device of the system of FIGS. 1 and 2 in accordance with some embodiments.

FIG. 3 sets forth a schematic diagram that illustrates a communication device 200 according to some embodiments of the present disclosure. The communication device 200 may be, for example, embodied in the portable radio 104, the RSM video capture device 106, the laptop 114, the mobile communication device 133, the infrastructure controller 156, the dispatch console 158, one or more computing devices in the cloud computing cluster 162, or some other communication device not illustrated in FIG. 1, and/or may be a distributed communication device across two or more of the foregoing (or multiple of a same type of one of the foregoing) and linked via a wired and/or wireless communication link(s). In some embodiments, the communication device 200 (for example, the portable radio 104) may be communicatively coupled to other devices such as the sensor-enabled holster 118 as described above. In such embodiments, the combination of the portable radio 104 and the sensor-enabled holster 118 may be considered a single communication device 200.

While FIG. 3 represents the communication devices 200 described above with respect to FIGS. 1 and 2, depending on the type of the communication device, the communication device 200 may include fewer or additional components in configurations different from that illustrated in FIG. 3. For example, in some embodiments, the communication device 200 acting as the infrastructure controller 156 may not include one or more of the screen 205, microphone 220, imaging device 221, and speaker 222. As another example, in some embodiments, the communication device 200 acting as the portable radio 104 of the RSM video capture device 106 may further include a location determination device (for example, a global positioning system (GPS) receiver) as explained above. Other combinations are possible as well.

As shown in FIG. 3, the communication device 200 includes a communications unit 202 coupled to a common data and address bus 217 of a processing unit 203. The communication device 200 may also include one or more input devices (for example, keypad, pointing device, touch-sensitive surface, button, a microphone 220, an imaging device 221, and/or another input device 206) and an electronic display screen 205 (which, in some embodiments, may be a touch screen and thus also acts as an input device), each coupled to be in communication with the processing unit 203.

The microphone 220 may be present for capturing audio from a user and/or other environmental or background audio that is further processed by processing unit 203 in accordance with the remainder of this disclosure and/or is transmitted as voice or audio stream data, or as acoustical environment indications, by communications unit 202 to other portable radios and/or other communication devices. The imaging device 221 may provide video (still or moving images) of an area in a field of view of the communication device 200 for further processing by the processing unit 203 and/or for further transmission by the communications unit 202. A speaker 222 may be present for reproducing audio that is decoded from voice or audio streams of calls received via the communications unit 202 from other portable radios, from digital audio stored at the communication device 200, from other ad-hoc or direct mode devices, and/or from an infrastructure RAN device, or may playback alert tones or other types of pre-recorded audio.

The processing unit 203 may include a code Read Only Memory (ROM) 212 coupled to the common data and address bus 217 for storing data for initializing system components. The processing unit 203 may further include an electronic processor 213 (for example, a microprocessor or another electronic device) coupled, by the common data and address bus 217, to a Random Access Memory (RAM) 204 and a static memory 216.

The communications unit 202 may include one or more wired and/or wireless input/output (I/O) interfaces 209 that are configurable to communicate with other communication devices, such as the portable radio 104, the laptop 114, the wireless RAN 152, and/or the mobile communication device 133.

For example, the communications unit 202 may include one or more wireless transceivers 208, such as a DMR transceiver, a P25 transceiver, a Bluetooth transceiver, a Wi-Fi transceiver perhaps operating in accordance with an IEEE 802.11 standard (for example, 802.11a, 802.11b, 802.11g), an LTE transceiver, a WiMAX transceiver perhaps operating in accordance with an IEEE 802.16 standard, and/or another similar type of wireless transceiver configurable to communicate via a wireless radio network.

The communications unit 202 may additionally or alternatively include one or more wireline transceivers 208, such as an Ethernet transceiver, a USB transceiver, or similar transceiver configurable to communicate via a twisted pair wire, a coaxial cable, a fiber-optic link, or a similar physical connection to a wireline network. The transceiver 208 is also coupled to a combined modulator/demodulator 210.

The electronic processor 213 has ports for coupling to the display screen 205, the microphone 220, the imaging device 221, the other input device 206, and/or the speaker 222. Static memory 216 may store operating code 225 for the electronic processor 213 that, when executed, performs one or more of the steps set forth in FIG. 4 and the accompanying text. The static memory 216 may comprise, for example, a hard-disk drive (HDD), an optical disk drive such as a compact disk (CD) drive or digital versatile disk (DVD) drive, a solid state drive (SSD), a tape drive, a flash memory drive, or a tape drive, and the like.

2. Processes for Responding to a Query

In some embodiments, an individual component and/or a combination of individual components of the system 100 may be referred to as an electronic computing device that implements an electronic digital assistant as mentioned above. For example, the electronic computing device may be a single electronic processor (for example, the electronic processor 213 of the portable radio 104). In other embodiments, the electronic computing device includes multiple electronic processors distributed remotely from each other. For example, the electronic computing device may be implemented on a combination of at least two of the electronic processor 213 of the portable radio 104, the electronic processor 213 of the infrastructure controller 156, and the electronic processor 213 of a back-end device in the cloud computing cluster 162 accessible via the IP network 160.

To use the electronic digital assistant implemented by the electronic computing device, the user 102 may, for example, provide an oral query that is received by the microphone 220 of the communication device 200. The electronic computing device receives signals representative of the oral query from the microphone 220 and analyzes the signals to determine the content of the oral query. For example, the electronic computing device may include a natural language processing (NLP) engine configured to determine the intent and/or content of the oral query. The electronic computing device may also be configured to determine a response to the oral query (for example, by retrieving stored data or by requesting data from a database such as one of the databases 164) and provide the response to an output device of the communication device 200 (for example, one or more of the speaker 222 via a generated audio response and the screen 205 via a generated text-based response). In other words, one or more of the communication device 200, embodied in one or more of the communication devices of FIG. 1, such as the portable radio 104, the infrastructure controller 156, and/or cloud computing cluster 162 may include a natural language processing engine to analyze oral queries received by the microphone 220 of the communication device 200 and provide responses to the oral queries in the form of audio data, image data, or text data.

Although an oral query is described above, in some embodiments, the electronic computing device receives and responds to other types of queries and inputs. For example, the user 102 may submit a text query to the electronic computing device by typing the text query into a hard keyboard input device or a soft keyboard input provided on the screen 205 of the communication device 200. As another example, the user 102 may use the imaging device 221 to capture an image or video of an area and press a hard or soft key to send the image or video to the electronic computing device to, for example, allow the electronic computing device to identify an object in the image or video.

To respond to a query, the electronic computing device that implements the electronic digital assistant may perform a method 400 illustrated in FIG. 4.

FIG. 4 illustrates a flow chart diagram of the method 400 performed by the electronic computing device for responding to a query. While a particular order of processing steps, message receptions, and/or message transmissions is indicated in FIG. 4 as an example, timing and ordering of such steps, receptions, and transmissions may vary where appropriate without negating the purpose and advantages of the examples set forth in detail throughout the remainder of this disclosure.

At block 405, the electronic computing device receives a user query from the user 102 for providing a response at a first communication device. The electronic computing device receives the user query via an input device (for example, an oral query received by the microphone 220, a typed query received by the screen 205, or another type of query received by another input device of the communication device 200 as described above). In one embodiment, the electronic computing device monitors communications exchanged on a group communication channel of a particular communication group and determines if a particular communication (for example, audio transmitted and/or received by the first communication device) corresponds to a user query. The user of the first communication device (for example, communication device 200A shown in FIG. 2) sends a group communication on the first communication group 250 seeking a response regarding home address of a primary witness of an incident. In accordance with some embodiments, the electronic computing device automatically monitors communications between communications devices 200A, 200B, and 200C in the first communication group 250 and determines that a user associated with the communication device 200A has a query based on the communications from the communication device 200A on a group communication channel associated with the first communication group 250. The electronic computing device may determine that the communications from communication device 200A or user input received via an input device of the communication device 200A corresponds to a user query by analyzing content (e.g., words) included in the communications or the user input. In one embodiment, the device at which the user query is received and a device at which the response to the query is to be provided may be different and automatically determined by the electronic computing device either from the query itself or based on predetermined user input.

At block 410, the electronic computing device determines whether a response to the query is to be provided as a group response. In one embodiment, the electronic computing device processes the oral query received at the microphone 220 or a typed query received by the screen 205 and determines whether the subject matter (e.g., intent and/or content of the query) of the query is relevant to one or more communication groups with which the user of the first communication device is a member. In this embodiment, the electronic computing device analyzes the words contained in the query using NLP engine to obtain the meaning of the query and determine whether the subject matter is relevant to one or more communication groups. The electronic computing device may also use additional information (such as context information obtained from data received from sensor devices and other type of information such as user's current incident assignment, location, role, communication groups, and/or historical queries/actions) to determine whether the user query is relevant to one or more communication groups associated with the user. If it is determined that the subject matter of the query is relevant to a particular communication group associated with the user, then the electronic computing device determines that the response to the query is to be provided as a group response. In another embodiment, the electronic computing device is configured to determine that a response to a query is to be provided as a group response if the query is received during a talk group communication, for example, when the PTT switch was activated to initiate a user query. In this case, the electronic computing device automatically detects that the user intends to ask a question to other members of the talk group and therefore determines that the response to the query is also to be provided as a group response in the talk group.

At block 415, when the electronic computing device determines (at block 410) that the response to the query is not to be provided as the group response (i.e., the subject matter of query is not relevant to any communication group associated with the user), the electronic computing device generates a response to the query and provides an individual response at the first communication device. For example, the electronic computing device determines that the oral query or the text query is not relevant to any communication group with which the user of the first communication device is a member and provides an individual response at the first communication device. The electronic computing device may generate a response based on data stored at a remote network device (for example, home address of a witness stored in the database(s) 164). In one embodiment, the electronic computing device establishes a private channel for communication with the first communication device of the user and transmits the individual response to the query on the private channel. The response may be displayed as text message via the screen 205 or alternatively played back as an audio output via speaker 222. In another embodiment, when the electronic computing device generates a response (for example, contact information stored at the static memory 216) locally at the first communication device, the electronic computing device directly outputs the response either as a text message or video message via the screen or as an audio output via speaker 222.

In accordance with some embodiments, when the electronic computing device determines that the response to the query is not to be provided as a group response, the electronic computing device further determines whether to provide an individual response to the first communication device based on whether the first communication device or corresponding user has permission to access the contents of the individual response. In these embodiments, if the first communication device or the corresponding user does not have permission to access the contents of the individual response, the electronic computing device may modify the content of the individual response (e.g., by replacing restricted content in the response with unrestricted content or other content for which the first communication device has permission or by completely removing the restricted content) and provides the modified individual response at the first communication device (e.g., via a private call). Alternatively, the electronic computing device may not provide the individual response at the first communication device if the first communication device or the corresponding user does not have permission to access the contents of the individual response.

At block 420, when the electronic computing device determines (at block 410) that the response is to be provided as a group response (i.e., the subject matter of query is relevant to a first communication group associated with the user), the electronic computing device determines whether each device (for example, communication devices 200A, 200B, 200C) in the first communication group 250 (with which the user of the first communication device is a member) has permission to receive the group response. In accordance with some embodiments, the electronic computing device further determines whether the users (corresponding to the communication devices) in the group have permission to receive the group response and takes similar actions as described below in blocks 420 through 450. Accordingly, the electronic computing device may determine permissions for devices and corresponding users, respectively, to determine whether to modify the group response or alter the output action with which the group response is provided.

In one embodiment, the electronic computing device determines whether a response (also referred to as a group response or unmodified group response) generated in response to the query includes any restricted data. If the response includes restricted data, the electronic computing device (or another dedicated electronic computing device in the system 100 acting as a security manager and configured to check security privileges of users) accesses the permission level of each communication device (including the communication device at which the user query has originated or is received) and compares a security level of the restricted data with a respective permission level of each of the communication devices in the group. When the respective permission level of each of the communication devices 200 in the group match (or above the security level, the electronic computing device determines that each communication device in the group has sufficient security privileges to access the restricted data and therefore also has permission to receive the group response. Alternatively, when the respective permission level of at least one of the communication devices in the group does not match or is below the security level, the electronic computing device determines that at least one of the communication devices in the group does not have sufficient security privileges to access the restricted data and therefore also does not have permission to receive the group response.

At block 425, when the electronic computing device determines (at block 420) that each device in the communication group has permission to receive the group response, the electronic computing device transmits the group response (i.e., an unmodified group response) on a group communication channel associated with the first communication group such that each communication device including the first communication device in the first communication group receives the group response.

At block 430, when the electronic computing device determines (at block 420) that at least one communication device in the first communication group does not have permission to receive the group response, the electronic computing device determines whether to override the security level associated with the restricted data of the group response. For example, when the security level is overridden, the restricted data may be made temporarily accessible to communication devices not having permission levels matching the security level of the restricted data. In one embodiment, the electronic processor may be configured to override the security level associated with the restricted data when the user query itself (or a subsequently received user query or instruction) includes authorization to override the security level of any restricted data contained in the response to be generated. For example, the electronic computing device may further check whether this authorization to override the security level is received from a user of the communication device having sufficient security privileges (for example, having highest permission level in the group). In another embodiment, the electronic computing device may be configured to override the security level associated with the restricted data when portions of user query containing same restricted data is already transmitted on the group communication channel (i.e., received by other talk group members) associated with the first communication group. In this embodiment, the electronic computing device may be configured to recognize that the restricted data portion of the generated response is already made accessible for members of the first communication group when the user query was transmitted for the group and therefore override the security level associated with the restricted data. For example, the communication device 200A shown in FIG. 2 sends a user query "did you get a statement from witness John on the fire incident last Wednesday." In this example, it is possible that the user of communication device 200C in the same communication group (i.e., group 250) does not have permission to access the identity of the witness of the fire incident. However, since the user query is already transmitted on the first communication group (or alternatively user of communication device 200A is determined as having highest permission level), the electronic computing device may temporarily override the security level associated with the identity of this particular witness.

When the electronic computing device overrides the security level of the restricted data, the electronic computing device, as shown in block 425, transmits the group response (i.e., an unmodified group response with restricted data) on a group communication channel associated with the first communication group such that the group response is accessible (e.g., for play back) by all communication devices (including communication devices which previously did not have permission to access the restrict data) in the first communication group.

At block 435, when the electronic computing device determines (at block 430) not to override the security level of restricted data, the electronic computing device determines whether to modify the group response such that each device in the first communication group will have permission to access the modified group response or alternatively to alter the output action associated with the providing the unmodified group response. In one embodiment, the electronic computing device performs this determination based on a predetermined instruction to select one of modifying the response or altering the output action. In another embodiment, the electronic computing device performs this determination based on the number of users in the first communication group with permission (or no permission) to access the restricted data. For example, if the number of users not having permission to access the restricted data is more than the number of users having permission to access the restricted data, the electronic computing device may select to modify the group response rather than altering the output action. Other possibilities exist as well.

At block 440, when the electronic computing device determines (at block 435) to modify the group response, the electronic computing device modifies the group response to generate a second response. In accordance with some embodiments, the group response is modified to generate a second response based on at least one of a) replacing the restricted data in the group response with unrestricted data, for example by replacing name of a witness with an alias; b) replacing the restricted data with another restricted data having security level matching the respective permission level of each of the plurality of communication devices in the communication group, for example by replacing name of a witness with witness type; c) removing the restricted data, for example, by completely removing the identity of the witness; and d) encoding at least a portion of the group response containing the restricted data, for example by encoding or scrambling the data containing the identity of the witness, such that the identity of the witness is unintelligible for devices not having permissions. In accordance with some embodiments, when the group response to be provided includes an image or video content, the electronic computing device may modify or remove portions of the image or video content to generate a modified response. For example, the electronic computing device may modify selected regions or pixels within the image containing restricted image objects or information (e.g., faces of persons, license plate number, background of an incident scene etc.) to generate the modified response. Similarly, when the group response to be provided includes a text message, the electronic computing device modifies the text message to replace or remove the restricted text portion.

At block 445, the electronic computing device transmits the second response (i.e., the modified group response) to at least one of the communication devices in the first communication group. In one embodiment, the electronic computing device transmits the second response on a group communication channel associated with the first communication group such that each communication device in the first communication group receives the second response. The electronic computing device may optionally provide the unmodified group response to one or more communication devices in the first communication group having permissions to receive the restricted data portion of the unmodified group response. This ensures that the communication devices having sufficient security privileges separately receive the complete response in addition to the modified group response (i.e., the second response) transmitted on the group communication channel. The electronic computing device may send the unmodified group response individually (e.g., via a private channel) to each communication device in the first communication group having permission to receive the unmodified group response. Alternatively, the electronic computing device may establish a new communication group (for example, a temporary talk group) including only communication devices in the first communication group having permissions to receive the unmodified group response and send the unmodified group response to a group communication channel associated with the new communication group.

At block 450, when the electronic computing device determines at block 435 to alter the output action associated with providing the unmodified group response, the electronic computing device alters an output action and provides the unmodified group response to at least one of the communication devices in the first communication group in accordance with the altered output action. In one embodiment, the electronic computing device transmits the group response on a group communication channel associated with the first communication group such that each communication device in the group receives the unmodified group response, but the altered output action causes suppression of playback or display of the group response at the communication devices in the first communication group which do not have permission to receive the restricted data portion of the unmodified group response. In one embodiment, the electronic computing device includes the identity (talk group member identifier) of communication devices not having permission to receive the restricted data (as part of the generated response or as a separate message) to allow the communication devices to recognize and suppress the play back or display of the portions of the message containing the restricted data. In this embodiment, the electronic computing device or other computing device in the system 100 may configure a security restriction policy for communication devices in the system 100 to ensure that the communication devices receiving such suppression message suppress the play back or display of the restricted data. In another embodiment, one or more network components (for example, at the infrastructure controller 156 or at the infrastructure RAN 152) in the system 100 may receive the identity of communication devices not having permission to receive the restricted data and may mute the communication channel or disconnect the communication paths associated with the identified communication device to cause the suppression of play back of the portions of the message containing the restricted data.

In another embodiment, the electronic computing device, instead of suppressing the play back of the restricted data at the communication devices not having permissions, causes (for example, instructs a PTT server or another computing device at the infrastructure controller 156) removal of the communication devices (from the first communication group) not having permission to receive the unmodified group response. The electronic computing device then transmits the unmodified group response on a group communication channel associated with the first communication group such that only communication devices having permissions to receive the restricted data receives the unmodified group response. Alternatively, the electronic computing device may cause creation of a new communication group including only those communication devices having permissions to receive the restricted data and transmit the unmodified group response on a communication channel associated with the new communication group, such that only communication devices having permissions to receive the restricted data receive the unmodified group response.

In accordance with some embodiments, the electronic computing device is also configured to determine whether a user query received for providing a response at the first communication device contains restricted data and modify the user query or alter an output action associated with providing the user query based on the determination.

Referring to FIG. 5, a flow chart diagram illustrates a method 500 performed by the electronic computing device for processing a user query depending on whether the user query corresponds to a group query. While a particular order of processing steps, message receptions, and/or message transmissions is indicated in FIG. 5 as an example, timing and ordering of such steps, receptions, and transmissions may vary where appropriate without negating the purpose and advantages of the examples set forth in detail throughout the remainder of this disclosure.

At block 505, the electronic computing device receives a user query from the user 102 for providing a response at a first communication device (e.g., communication device 200A shown in FIG. 2). The electronic computing device receives the user query via an input device (for example, an oral query received by the microphone 220, a typed query received by the screen 205, or another type of query received by another input device of the communication device 200 as described above). The electronic computing device may determine that user input received via an input device of the communication device 200A corresponds to a user query by analyzing words included in the user input.

At block 510, the electronic computing device determines whether the user query received at the first communication device corresponds to a group query that needs to be further transmitted on a group communication channel associated with a communication group (for example, first communication group 250) of the first communication device. In one embodiment, the electronic computing device processes the oral query received at the microphone 220 or a typed query received by the screen 205 and determines whether the subject matter of query is relevant to one or more communication groups with which the user of the first communication device is a member. In this embodiment, the electronic computing device analyzes the words contained in the query using NLP engine to obtain the meaning and intent of the query and determine whether the subject matter is relevant to one or more communication groups. The electronic computing device may also use additional information (such as context information obtained from data received from sensor devices and other type of information such as user's current incident assignment, location, role, communication groups, historical queries/actions, and the like) to determine whether the user query is relevant to one or more communication groups associated with the user. If it is determined that the subject matter of the query is relevant to a communication group of the user, then the electronic computing device determines that the query is a group query and further needs to be transmitted to other communication devices that are members of the same communication group as the first communication device. In another embodiment, the electronic computing device is configured, by default, to determine that a query received at the first communication device corresponds to a group query for transmission on the group communication channel for receipt by other communication devices in the group.

At block 515, when the electronic computing device determines (at block 510) that the query does not correspond to a group query, the electronic computing device refrains from transmitting the query on a group communication channel. For example, if a query is received at the communication device 200A shown in FIG. 2 and if it does not correspond to a group query, then the electronic computing device does not transmit the query to other communication devices 200A, 200B that are members of the first communication group 250. In this case, the electronic computing device may further process the query and generate a response to the query for receipt only at the first communication device (i.e. at communication device 200A) at which the query was received. The response may be displayed as text message via the screen 205 or alternatively played back as an audio output via speaker 222.

At block 520, when the electronic computing device determines (at block 510) that the query corresponds to a group query, the electronic computing device determines whether each device in the first communication group (with which the user of the first communication device is a member) has permission to receive the query. In one embodiment, the electronic computing device determines whether the query (also referred to as unmodified query) includes any restricted data. If the query includes any restricted data, the electronic computing device accesses the permission level of other communication devices associated with the communication group of the first communication device and compares a security level of the restricted data with a respective permission level of the other communication devices in the group. When the respective permission level of other communication devices in the group match (or is above) the security level, the electronic computing device determines that each communication device in the group has sufficient security privileges to access the restricted data and therefore also has permission to receive the query. Alternatively, when the respective permission level of at least one of the communication devices in the group does not match or is below the security level, the electronic computing device determines that at least one of the communication devices in the group does not have sufficient security privileges to access the restricted data and therefore also does not have permission to receive the query.

At block 525, when the electronic computing device determines that each device in the communication group has permission to receive the query, the electronic computing device transmits the query (i.e., the unmodified query) on a communication channel associated with the first communication group such that other communication devices in the first communication group receives the query. In accordance with some embodiments, a response (to the query) provided by one or more communication devices in the first communication group is processed in accordance with the method 400 described in FIG. 4.

At block 530, when the electronic computing device determines that at least one communication device in the first communication group does not have permission to receive the query, the electronic computing device determines whether to override the security level associated with the restricted data of the query. For example, when the security level is overridden, the restricted data may be made temporarily accessible to communication devices not having permission levels matching the security level of the restricted data. In one embodiment, the electronic processor may be configured to override the security level associated with the restricted data when the user query itself (or a subsequently received user query or instruction) includes authorization (and user has sufficient security privileges) to override the security level of any restricted data contained in the query.

When the electronic computing device overrides the security level of the restricted data, the electronic computing device, at block 525, transmits the query (i.e. unmodified user query with restricted data) on a group communication channel associated with the first communication group such that the query is received by other communication devices (including communication devices which previously did not have permission to access the restrict data) in the first communication group.

At block 535, when the electronic computing device determines (at block 530) not to override the security level of restricted data, the electronic computing device determines whether to modify the query such that each device in the first communication group will have permission to access the modified query or alternatively to alter the output action associated with providing the unmodified query. In one embodiment, the electronic computing device performs this determination based on a predetermined input instruction to select one of modifying the response or altering the output action. In another embodiment, the electronic computing device performs this determination based on the number of users in the first communication group with permission (or no permission) to access the restricted data. For example, if the number of users not having permission to access the restricted data is more than the number of users having permission to access the restricted data, the electronic computing device may select to modify the query rather than altering the output action. Other possibilities exist as well.

At block 540, when the electronic computing device determines (at block 535) to modify the query, the electronic computing device modifies the query to generate a modified query. In accordance with some embodiments, the query is modified based on at least one of a) replacing the restricted data in the query with unrestricted data; for example by replacing name of a witness with a general name b) replacing the restricted data with another restricted data having security level matching the respective permission level of each of the plurality of communication devices in the communication group, for example by replacing name of a witness with witness type; c) removing the restricted data; for example, by completely removing the identity of the witness, and d) encoding at least a portion of the group response containing the restricted data, for example by encoding or scrambling the data containing the identity of the witness, such that the identity of the witness is unintelligible for devices not having permissions.

At block 545, the electronic computing device provides the modified query to at least one of the communication devices in the first communication group. In one embodiment, the electronic computing device transmits the modified query on a group communication channel associated with the first communication group such that each communication device in the first communication group receives the modified query. The electronic computing device may optionally provide the unmodified query to one or more communication devices (in the first communication group) having permissions to receive the restricted data portion of the unmodified group response. This ensures that the communication devices having sufficient security privileges separately receive the complete query in addition to the modified query transmitted on the group. The electronic computing device may send the unmodified query individually (e.g., via a private channel) to each communication device in the first communication group having permission to receive the unmodified group response. Alternatively, the electronic computing device may establish a new communication group (for example, a temporary communication group) including only communication devices in the first communication group having permission to receive the unmodified query and send the unmodified query to a group communication channel associated with the new communication group. In response to the query, one or more communication devices may provide a response on the group communication channel and such a response is processed in accordance with the method 400 described in FIG. 4.

At block 550, when the electronic computing device determines at block 535 to alter the output action associated with providing the unmodified query, the electronic computing device alters an output action and provides the unmodified query to at least one of the communication devices in the first communication group in accordance with the altered output action. In one embodiment, the electronic computing device transmits the query on a group communications channel associated with the first communication group such that each communication device in the group receives the unmodified query, but the altered output action causes suppression of playback or display of the query at the communication devices in the first communication group which do not have permission to receive the restricted data portion of the query. In one embodiment, the electronic computing device includes the identity (member identifier) of communication devices not having permission to receive the restricted data (as part of the query or as a separate message) to allow the communication devices to recognize and suppress the play back or display of the portions of the message containing the restricted data. In this embodiment, the electronic computing device or another computing device in the system 100 may configure a security restriction policy for communication devices in the system 100 to ensure that the communication devices receiving such suppression message suppress the play back or display of the restricted data for the user. In another embodiment, one or more network components (for example, at the infrastructure controller 156 or at the infrastructure RAN 152) in the system 100 may receive the identity of communication devices not having permission to receive the restricted data and may mute the communication channel or disconnect the communication paths associated with the identified communication device to cause the suppression of play back of the portions of the message containing the restricted data.

In another embodiment, the electronic computing device, instead of suppressing the play back at the communication devices, causes (for example, by instructing a PTT server or another computing device at the infrastructure controller 156) removal of the communication devices (from the first communication group) not having permission to receive the unmodified query and transmits the unmodified query on a group communication channel associated with the first communication group such that only communication devices having permission to receive the restricted data receives the unmodified query. Alternatively, the electronic computing device may cause creation of a new communication group including only those communication devices having permission to receive the restricted data and transmit the unmodified query on a group communication channel associated with the new communication group, such that only those communication devices having permission to receive the restricted data receives the unmodified query.

In accordance with some embodiments, the electronic computing device, after processing the query and transmitting the query either by modifying the query or altering the output action, also proceeds to generate a response to the query for receipt by communication devices in the first communication group in accordance with the method 400 described in FIG. 4.

In accordance with some embodiments, the first communication device receiving the query (for example, an oral query) may determine that the electronic computing device (for example, when implemented in a cloud computing cluster to process the query received at the first communication device) itself does not have permission to access a restricted data portion of the query, and therefore further do not have permission to process the query and generate a response. In response to this determination, the first communication device refrains from further transmitting the query to the electronic computing device for processing. In this case, the first communication device may locally process the query and generate a response or alternatively forwards the query to another electronic computing device having permissions to access the restricted data portion of the query and further process the query for generating a response.

In accordance with embodiments of the disclosure, system and methods described herein can be advantageously employed in public safety environments, where data security is of paramount importance. Embodiments of the disclosure allow users such as public safety officers to automatically receive relevant information based on queries provided by other users who are members of the same group while ensuring that restricted or confidential portion of the query or a response to the query is not shared with any member in the group who does not have permission to access such restricted or confidential data.

In the foregoing specification, specific embodiments have been described. However, one of ordinary skill in the art appreciates that various modifications and changes may be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment may be implemented as a computer-readable storage medium having computer readable code stored thereon for programming a computer (for example, comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it may be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

I claim:

1. A method for responding to a query, the method comprising:
   receiving, at an electronic computing device, a query for providing a response at a first communication device, wherein the first communication device is a member of a first communication group of a plurality of communication devices;
   determining, at the electronic computing device, that the response to the query is to be provided as a group response to the plurality of communication devices including the first communication device in the first communication group;
   determining, at the electronic computing device, that restricted data is to be included in at least a portion of the group response;
   determining, at the electronic computing device, whether one or more of the communication devices or corresponding users in the first communication group do not have permission to receive the restricted data to be included in the group response; and
   in response to determining that one or more of the communication devices or corresponding users do not have permission to receive the restricted data to be included in the group response, causing, at the electronic computing device, one or more of
      (i) modifying the group response to generate a second response for which each of the communication devices or corresponding users in the first communication group has permission to receive the second response and providing the second response to at least one of the communication devices in the first communication group, and
      (ii) altering an output action and providing the group response to at least one of the communication devices in the first communication group in accordance with the altered output action.

2. The method of claim 1, wherein determining whether one or more of the communication devices or corresponding users in the first communication group do not have permission to receive the restricted data to be included in the group response comprises:
   comparing a security level of the restricted data with a respective permission level associated with each of the communication devices or corresponding users; and determining that the one or more of the communication devices does not have permission to receive the restricted data to be included in the group response when the respective permission level of the one or more of the communication devices or corresponding users does not match the security level.

3. The method of claim 2, further comprising:
determining whether to override the security level associated with the restricted data; and
transmitting the group response on a group communication channel associated with the first communication group in response to determining to override the security level associated with the restricted data.

4. The method of claim 2, wherein modifying the group response comprises one of:
modifying the group response by replacing the restricted data with unrestricted data;
modifying the group response by replacing the restricted data with another restricted data having security level matching the respective permission level of each of the communication devices in the first communication group;
modifying the group response by removing the restricted data; and
modifying the group response by encoding at least the portion of the group response including the restricted data.

5. The method of claim 2, wherein altering an output action comprises:
transmitting the group response to each of the communication devices in the first communication group; and
causing suppression of playback of at least the portion of the group response including the restricted data for the one or more of the communication devices.

6. The method of claim 2, wherein altering an output action comprises:
causing creation of at least one other communication group including only the communication devices other than the one or more of the communication devices in the first communication group; and
transmitting the group response on a group communication channel associated with the at least one other communication group.

7. The method of claim 2, wherein altering an output action comprises:
causing removal of the one or more of the communication devices from the first communication group; and
transmitting the group response on a group communication channel associated with the first communication group after removal of the one or more of the communication devices from the first communication group.

8. The method of claim 1, wherein providing the second response comprises:
transmitting the second response on a group communication channel associated with the first communication group.

9. The method of claim 8, further comprising:
transmitting the group response to communication devices other than the one or more of the communication devices in the first communication group.

10. The method of claim 1, further comprising:
in response to determining that each of the communication devices or corresponding users has permission to receive the restricted data to be included in the group response, transmitting the group response including the restricted data on a group communication channel for receipt by each of the communication devices in the first communication group.

11. The method of claim 1, further comprising:
determining, at the electronic computing device, that the query includes restricted data;
determining, at the electronic computing device, that one or more of the communication devices or corresponding users in the communication group do not have permission to receive the restricted data included in the query; and
causing, at the electronic computing device, one of,
modifying the query to generate a modified query for which each of the plurality of communication devices or corresponding users in the first communication group has permission to receive the modified query and providing the modified query to at least one of the communication devices in the first communication group, and
altering an output action corresponding to the query and providing the query to the one or more of the communication devices in the first communication group in accordance with the altered output action.

12. The method of claim 1, wherein the query corresponds to a speech input received at the first communication device.

13. The method of claim 1, wherein the group response includes at least one of audio data, image data, and text data.

14. An electronic computing device, comprising:
an electronic processor; and
a communication interface communicatively coupled to the electronic processor, wherein the electronic processor is configured to
receive, via the communication interface, a query for providing a response at a first communication device, wherein the first communication device is a member of a first communication group of a plurality of communication devices,
determine that the response to the query is to be provided as a group response to the plurality of communication devices including the first communication device in the first communication group,
determine that restricted data is to be included in at least a portion of the group response;
determine whether one or more of the communication devices or corresponding users in the first communication group do not have permission to receive the restricted data to be included in the group response, and
when one or more of the communication devices or corresponding users do not have permission to receive the restricted data to be included in the group response,
(i) modify the group response to generate a second response for which each of the communication devices or corresponding users in the first communication group has permission to receive the second response and provide, via the communication interface, the second response to at least one of the communication devices in the first communication group, and
(ii) alter an output action and provide, via the communication interface, the group response to at least one of the communication devices in the first communication group in accordance with the altered output action.

15. The electronic computing device of claim 14, further comprising:
a memory storing information identifying security level of restricted data and a respective permission level associated with each of the communication devices or corresponding users, wherein the electronic processor is further configured to
compare the security level of the restricted data with respective permission level associated with each of the communication devices or corresponding users, and
determine that the one or more of the communication devices or corresponding users does not have permission to receive the restricted data to be included in the group response when the respective permission level of the one or more of the communication devices does not match the security level.

16. The electronic computing device of claim 15, wherein the electronic processor is configured to:
modify the group response by one of replacing the restricted data with unrestricted data, replacing the restricted data with another restricted data having security level matching the respective permission level of each of the communication devices or corresponding users in the first communication group, removing the restricted data, and encoding at least the portion of the group response including the restricted data.

17. The electronic computing device of claim 15, wherein the electronic processor is further configured to:
transmit, via the communication interface, the group response to each of the communication devices in the first communication group; and
causing suppression of playback of at least the portion of the group response including the restricted data for the one or more of the communication devices.

18. The electronic computing device of claim 14, wherein the electronic processor is further configured to:
transmit, via the communication interface, the second response on a group communication channel associated with the first communication group.

19. The electronic computing device of claim 14, wherein the electronic processor is configured to transmit the group response on a group communication channel for receipt by each of the communication devices in the first communication group when each of the communication devices has permission to receive the restricted data to be included in the group response.

20. A method for responding to a query, the method comprising:
receiving, at an electronic computing device, a query for providing a response at a first communication device, wherein the first communication device is a member of a first communication group of a plurality of communication devices;
determining, at the electronic computing device, that the query corresponds to a group query that is to be provided to the communication devices in the first communication group;
determining, at the electronic computing device, that the query includes restricted data;
determining, at the electronic computing device, whether one or more of the communication devices in the first communication group do not have permission to receive the restricted data included in the query; and
in response to determining that one or more of the communication devices or corresponding users do not have permission to receive the restricted data included in the query, causing, at the electronic computing device, one or more of
(i) modifying the query to generate a modified query for which each of the communication devices or corresponding users in the first communication group has permission to receive the modified query and transmitting the modified query on a group communication channel associated with the first communication group, and
(ii) altering an output action and providing the query to at least one of the communication devices in the first communication group in accordance with the altered output action.

* * * * *